United States Patent
Storck et al.

(10) Patent No.: US 10,611,333 B2
(45) Date of Patent: Apr. 7, 2020

(54) VEHICLE SEAT BELT BUCKLE ATTACHMENT SYSTEM

(71) Applicant: GM GLOBAL TECHNOLOGY OPERATIONS LLC, Detroit, MI (US)

(72) Inventors: Kevin J. Storck, Clinton Township, MI (US); Mohan Bhogineni, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 63 days.

(21) Appl. No.: 15/981,961

(22) Filed: May 17, 2018

(65) Prior Publication Data

US 2019/0351867 A1    Nov. 21, 2019

(51) Int. Cl.
*B60R 22/20* (2006.01)
*B60R 22/18* (2006.01)
*B60R 22/26* (2006.01)
*B60R 22/22* (2006.01)

(52) U.S. Cl.
CPC .............. *B60R 22/20* (2013.01); *B60R 22/22* (2013.01); *B60R 22/26* (2013.01); *B60R 2022/1806* (2013.01)

(58) Field of Classification Search
CPC ......... B60R 22/22; B60R 22/20; B60R 22/26; B60R 2022/1806; B60R 2022/021; B60R 22/03
USPC ...................................................... 280/801.2
See application file for complete search history.

(56) References Cited

U.S. PATENT DOCUMENTS

| | | | | |
|---|---|---|---|---|
| 4,913,497 A * | 4/1990 | Knabel | ............... | B60R 22/1958 297/480 |
| 5,236,220 A * | 8/1993 | Mills | ....................... | B60R 22/22 280/801.1 |
| 5,332,261 A * | 7/1994 | Siepierski | ............... | B60R 22/22 280/801.1 |
| 5,782,492 A * | 7/1998 | Ojima | .................. | B60R 22/1958 280/806 |
| 5,984,357 A * | 11/1999 | Yasuda | ............... | B60R 22/1955 280/806 |
| 6,505,888 B1 * | 1/2003 | Teufel | .................. | B60N 2/4221 297/216.1 |
| 6,902,234 B2 * | 6/2005 | Becker | .................. | B60N 2/0715 248/421 |
| 7,036,878 B2 * | 5/2006 | Masutani | ............. | B60N 2/0732 297/216.1 |
| 7,407,193 B2 * | 8/2008 | Yamaguchi | ............. | B60R 22/03 280/801.1 |
| 7,516,987 B2 * | 4/2009 | Koide | .................. | B60R 22/1951 280/801.1 |
| 7,527,332 B2 * | 5/2009 | Sakai | .................... | B60N 2/1615 297/216.1 |
| 7,584,998 B2 * | 9/2009 | Richter | .................... | B60R 22/18 280/801.1 |
| 8,950,782 B2 * | 2/2015 | Dobruia | .................. | B60R 22/26 280/801.1 |
| 9,283,926 B2 | 3/2016 | Thomas et al. | | |
| 9,376,089 B1 | 6/2016 | Bruderick | | |
| 9,802,570 B1 * | 10/2017 | Elton | ...................... | B60R 22/22 |

(Continued)

*Primary Examiner* — Ruth Ilan
*Assistant Examiner* — Hilary L Johns

(57) ABSTRACT

A vehicle seat belt buckle attachment system includes an anchor bracket fixed to a vehicle, a pivot fixed to the anchor bracket, a buckle bracket defining a curved slot that receives the pivot, and a buckle connected to the buckle bracket.

19 Claims, 6 Drawing Sheets

(56) References Cited

U.S. PATENT DOCUMENTS

| | | | |
|---|---|---|---|
| 9,949,535 B2 | 4/2018 | Karuppaswamy et al. | |
| 2002/0021041 A1* | 2/2002 | Jessup | B60N 2/4221 |
| | | | 297/468 |
| 2002/0050707 A1* | 5/2002 | Nishide | B60R 22/22 |
| | | | 280/801.1 |
| 2003/0177621 A1* | 9/2003 | Schneider | A44B 11/12 |
| | | | 24/633 |
| 2005/0248199 A1* | 11/2005 | Epaud | B60N 2/3013 |
| | | | 297/378.1 |
| 2007/0164596 A1* | 7/2007 | Di Grande | B60R 22/02 |
| | | | 297/481 |
| 2014/0265503 A1* | 9/2014 | Thomas | B60N 2/16 |
| | | | 297/344.13 |
| 2019/0225185 A1* | 7/2019 | Ohno | B60N 2/0705 |

* cited by examiner

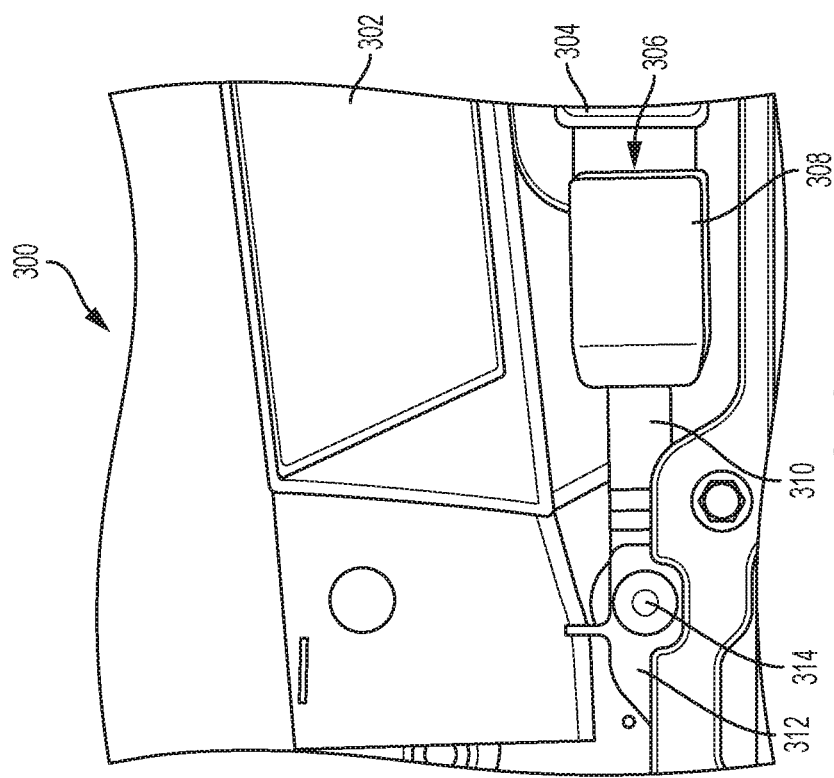
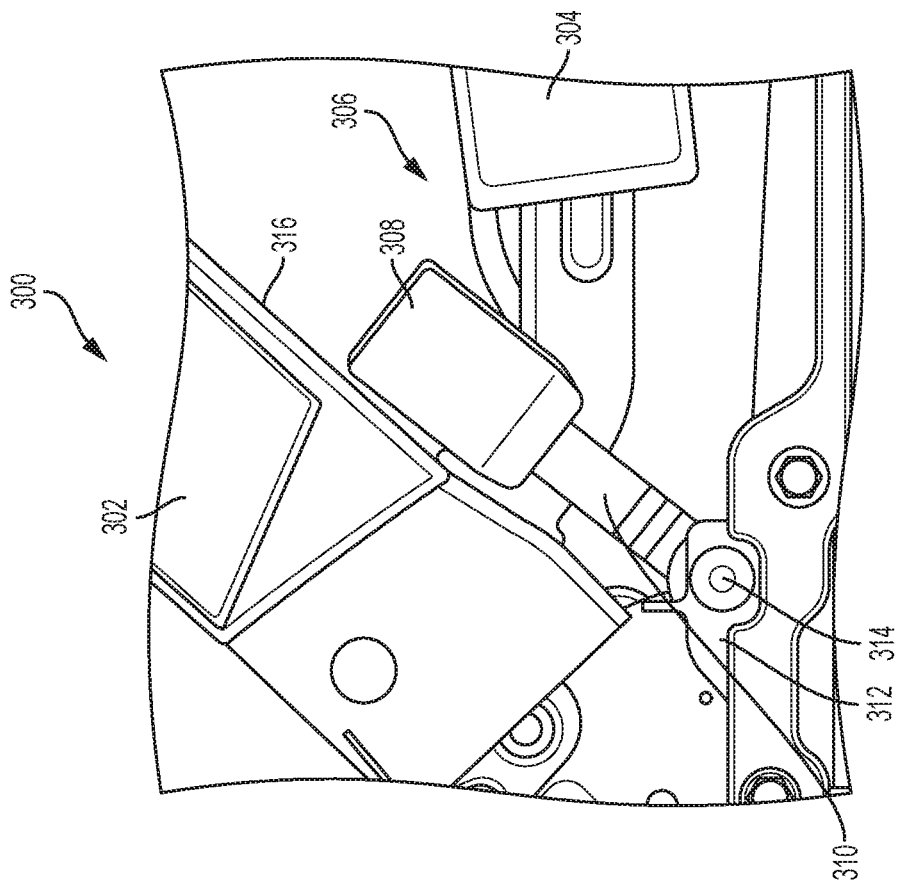

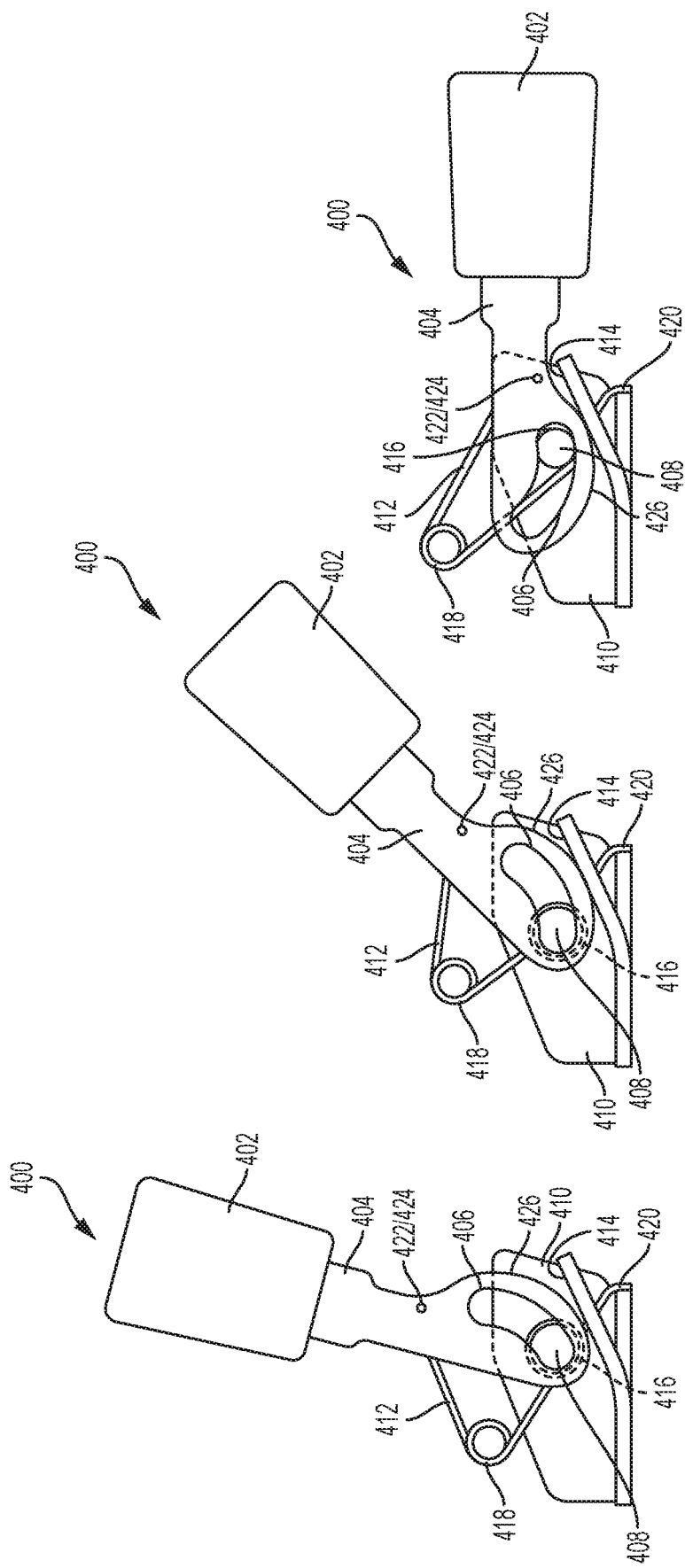

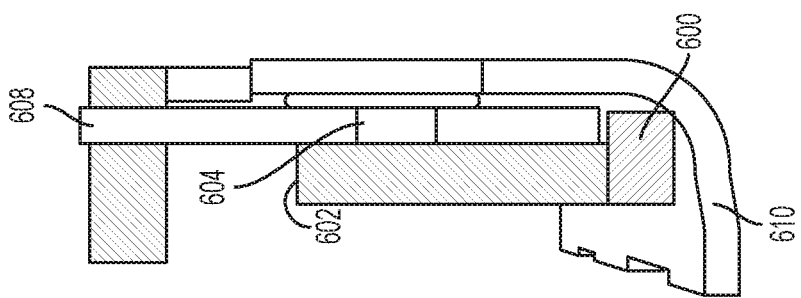
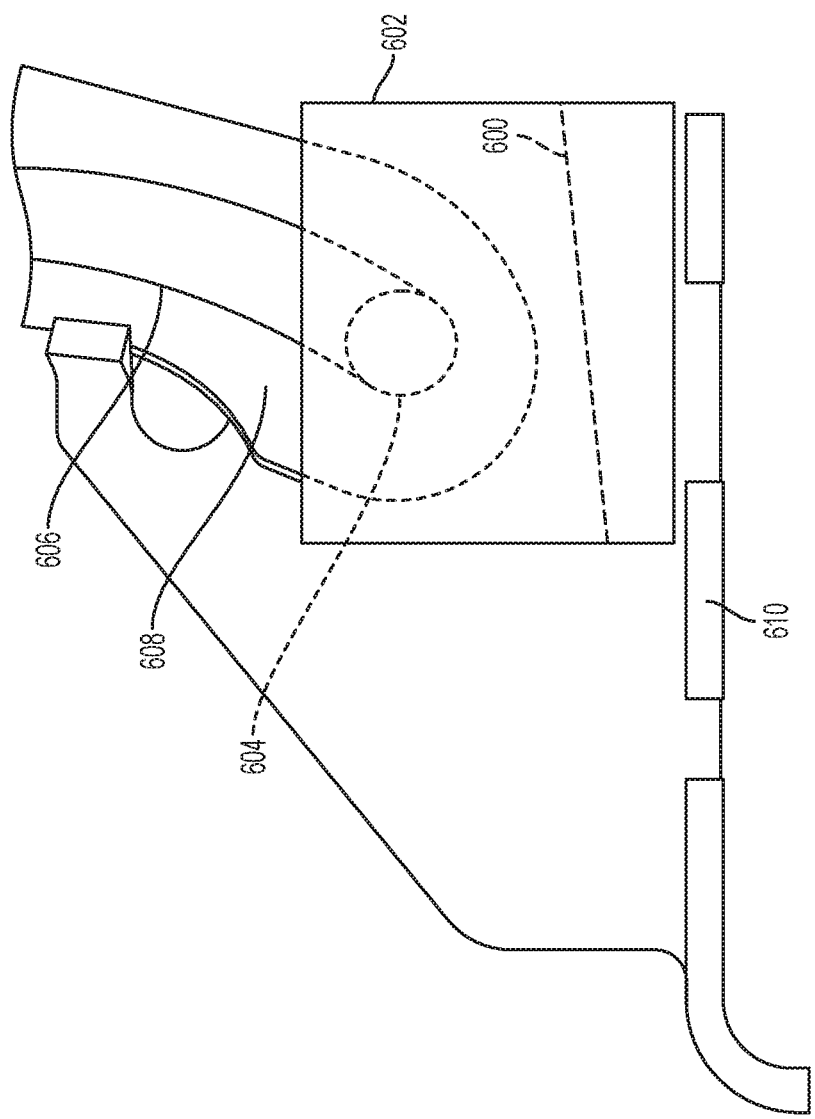

VEHICLE SEAT BELT BUCKLE ATTACHMENT SYSTEM

FIELD

The present disclosure relates to a vehicle seat belt buckle attachment system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicles include seat belt systems with buckles attached to the vehicle and/or seat structure. Some vehicles include a reconfigurable seat design in which the seat backs may be folded downward to a horizontal position which stows the seat away and provides an increased cargo or load floor area. Seat belt buckle attachment systems for these reconfigurable designs need to accommodate for the folding down of the seat back by moving to a stowed position and also to return to a usable, deployed position upon return of the vehicle back to an upright, usable position. In an exemplary seat belt attachment system, the buckle is connected to a bracket which is pivotally attached to an anchor bracket that is, in turn, attached to the vehicle and/or seat structure. In this manner, the buckle is able to pivot downwardly in response to the seat back rotating downwardly.

While the pivotable buckle bracket in these systems enables motion between the buckle being presented in a usable, deployed position when the adjacent seat back is upright and stowed away when the adjacent seat back is folded down, there is a risk of damage to the buckle and/or housing of the buckle in the event that a vertical load is applied to the buckle. For example, an object dropped onto the seat belt buckle may damage the buckle.

One approach which attempts to address this risk of buckle damage has been to provide a slot in the buckle bracket. The slot permits the buckle bracket to move downwardly on the pivot when a force is applied downward force is applied to the buckle. In this manner, the risk of buckle damage may be reduced. However, this conventional approach is significantly limited by the amount of space that is available to accommodate this downward motion. Space is at a premium in any vehicle and there may simply not be enough space available in the vehicle to provide for the buckle bracket moving downward.

A seat belt buckle attachment system which is usable with a reconfigurable seat design and which reduces the risk of buckle damage while simultaneously minimizing the space necessary to accommodate that system is needed.

SUMMARY

In an exemplary aspect, a vehicle seat belt buckle attachment system includes an anchor bracket fixed to a vehicle and/or seat, a pivot fixed to the anchor bracket, a buckle bracket defining a curved slot that receives the pivot, and a buckle connected to the buckle bracket. In this manner, buckle damage may be reduced and/or prevented in a buckle bracket assembly which is compact and which may be used together with a reconfigurable seat.

In another exemplary aspect, the anchor bracket includes a ramp surface positioned to guide rotation of the buckle bracket around the pivot in response to the pivot translating within the curved slot beyond a predetermined distance.

In another exemplary aspect, the pivot includes a ramp surface positioned to guide rotation of the buckle bracket around the pivot in response to the pivot translating within the curved slot beyond a predetermined distance.

In another exemplary aspect, the system further includes a torsion spring in contact with the anchor bracket and the buckle bracket.

In another exemplary aspect, the torsion spring biases rotation of the buckle bracket about the pivot in a first rotational direction.

In another exemplary aspect, the torsion spring includes a first torsion coil positioned around the pivot.

In another exemplary aspect, the torsion spring biases the pivot toward one end of the curved slot.

In another exemplary aspect, the torsion spring includes a second torsion coil that biases the pivot toward one end of the curved slot.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIGS. 3A-3D illustrate a side elevation view of a passenger seat and seat buckle attachment system;

FIGS. 4A-4C provide side elevation views of an exemplary seat buckle assembly 400 in accordance with the present disclosure;

FIG. 6A is an elevation view of a partial cross-section of another exemplary embodiment of the present disclosure;

FIG. 6B is another elevation view of the partial cross-section of the embodiment of FIG. 6A.

In the drawings, reference numbers may be reused to identify similar and/or identical elements.

DETAILED DESCRIPTION

Figure 1:
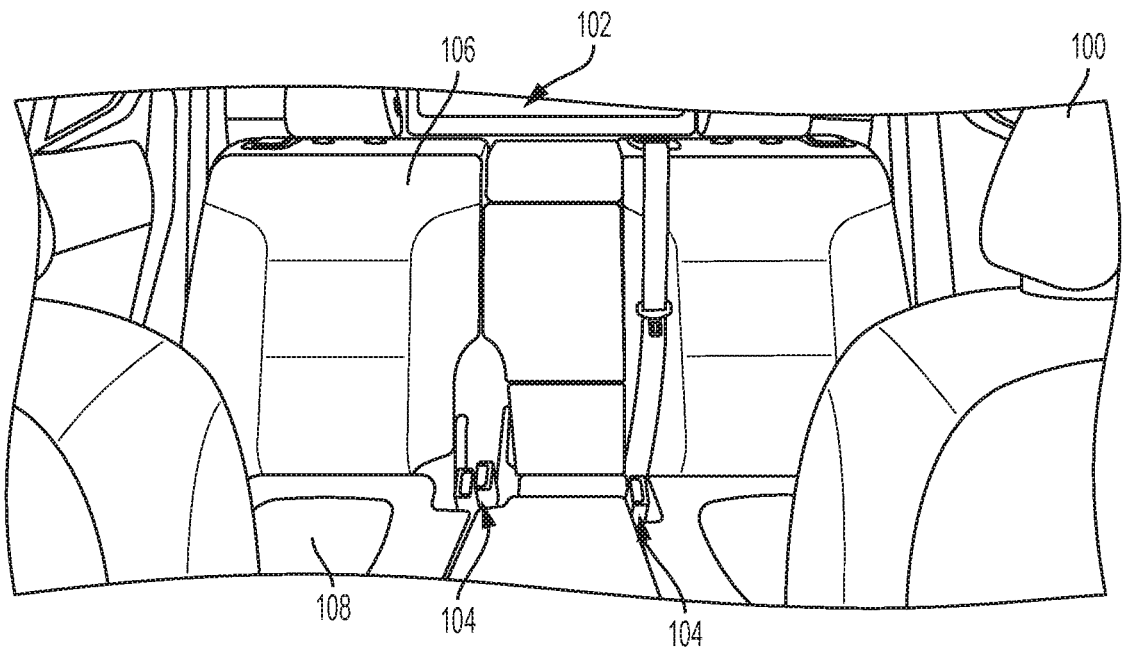
FIG. 1 is a schematic diagram of a is an interior view of a vehicle from a rearwardly facing perspective.
Figure 2:
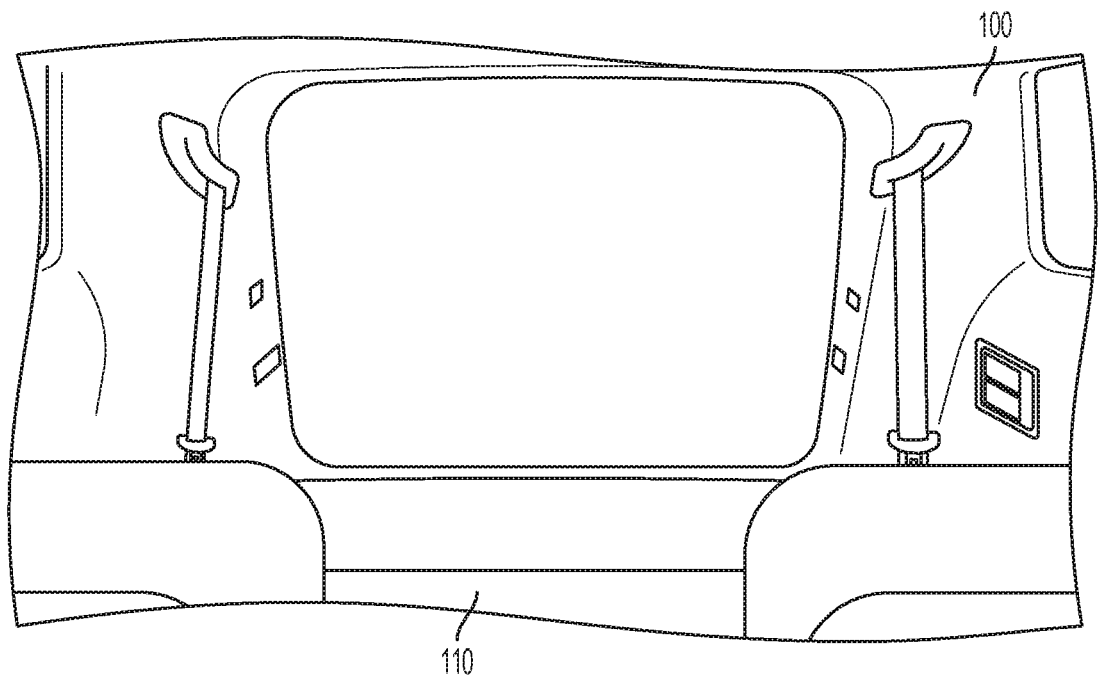
FIG. 2 illustrates the vehicle of FIG. 1 where the passenger seating has been reconfigured to provide for the additional cargo space.

Referring now to the drawings, FIG. 1 is an interior view of a vehicle 100 from a rearwardly facing perspective. The vehicle 100 includes passenger seating 102 incorporating a passenger restraint system in the form of a seat belt system. The seat belt system includes seat belt buckles 104 which are positioned at the intersection of the seat back 106 and the seat bottom 108. The passenger seating 102 is reconfigurable to a stowed configuration which provides for additional cargo space in the vehicle. FIG. 2 illustrates the vehicle 100 where the passenger seating 102 has been reconfigured to provide for the additional cargo space. In particular, the seat back 106 has pivoted downward such that the surface 110 of the seat back 106 which is rearwardly facing in the deployed position is repositioned such that it now forms a cargo or load floor. In this manner, the vehicle 100 may operate in multiple modes such that it may accommodate passengers in the passenger seating 102 deployed configuration or reduce the passenger accommodation capacity but provide additional cargo space.

FIGS. 3A-3D illustrate a side elevation view of a passenger seat 300 which is similar to that illustrated in FIGS. 1 and 2, as the passenger seat 300 transitions from a fully deployed configuration in which a passenger may be accommodated (in FIG. 3A) to a fully stowed configuration in which the passenger seat forms an extension of a cargo load floor. The passenger seat 300 includes a seat back 302 and a seat bottom 304. A seat belt buckle assembly 306 is also illustrated in FIGS. 3A-3D. The seat belt buckle assembly 306 includes a seat belt buckle 308 which is attached to a buckle bracket 310. The buckle bracket 310, in turn, is pivotally connected to an anchor bracket 312. The anchor bracket 312 may be attached to a seat frame or other fixed structure within the vehicle. The anchor bracket 312 incorporates a pivot 314 about which the buckle bracket 310 may pivot. The seat belt buckle assembly 306 may further include a spring (not illustrated) which biases the buckle bracket 310 toward the deployed position of FIG. 3A from the stowed position of FIG. 3D.

Figure 3A:
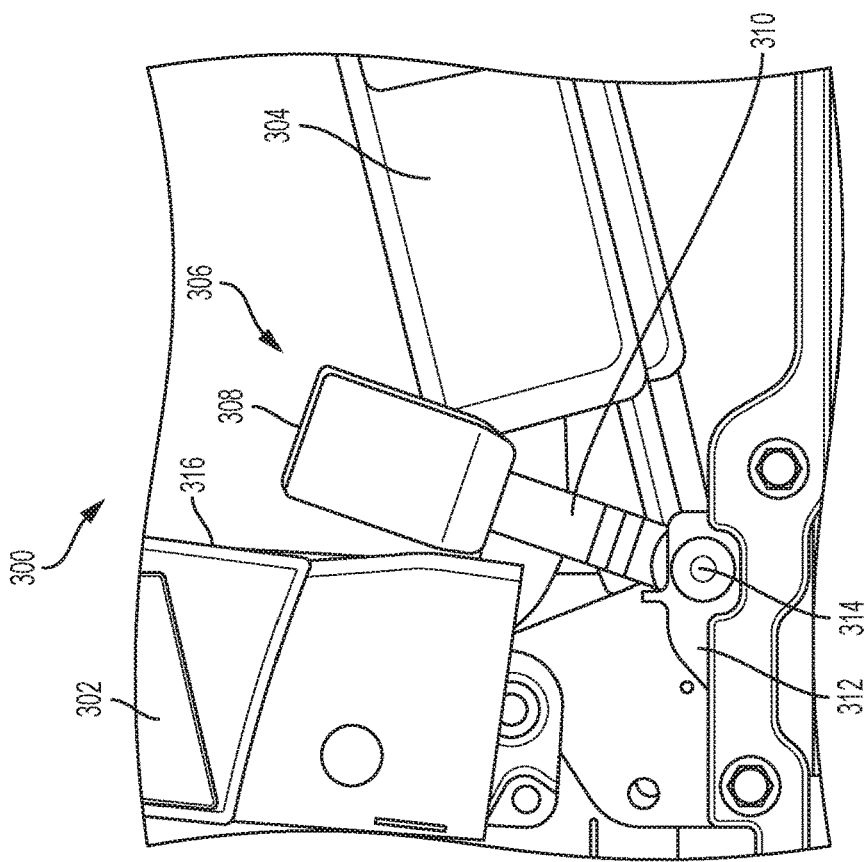

As is clearly illustrated, as the passenger seat 300 transitions from the deployed configuration of FIG. 3A to the stowed configuration of FIG. 3D, as the seat back 302 pivots downwardly, the front surface 316 contacts the buckle 308 and pushes the buckle forward. In response, as the seat back 302 continues to pivot forward and pushes on the buckle 308, the buckle 308 and buckle bracket 310 pivots about pivot 314 on the anchor bracket 312.

As explained previously, the buckle 308 of this seat buckle assembly 306 is at risk of damage when in the deployed configuration of FIG. 3A. The buckle 308 extends above the surface of the seat bottom 304 so that it is easily accessible by a passenger to engage the buckle with a seat belt (not shown). As a result, the buckle 308 is exposed to objects which may, for example, be dropped onto the seat bottom 304, to impact the buckle 308 and potentially damage that buckle 308.

FIGS. 4A-4C provide side elevation views of an exemplary seat buckle assembly 400 in accordance with the present disclosure. The buckle assembly 400 includes a buckle 402 attached to a buckle bracket 404. The buckle bracket 404 includes a curved slot 406 that receives a pivot pin 408 that is fixed to an anchor bracket 410. The anchor bracket 410 may be fixed to a vehicle structure such as a vehicle floor and/or seat structure. The seat buckle assembly 400 also includes a torsion spring 412. Optionally, the anchor bracket 410 may include a ramp surface 414.

The exemplary seat buckle assembly 400 operates in a manner which is similar to that described above with respect to FIGS. 3A-3C, in that the buckle 402 and buckle bracket 404 may rotate about pivot 408 in response to a seat back being repositioned from a deployed to a stowed configuration. Further, the torsion spring 412 may bias the buckle 402 and buckle bracket 404 toward the vertical position shown in FIG. 4A and away from the positions illustrated in FIGS. 4B and 4C. Additionally, and optionally, the anchor bracket 410 may include a stop tab (not shown) which may prevent the buckle 402 and buckle bracket 404 from continuing to rotate as a result of the bias from the spring 412. Alternatively, the seat back may operate to limit the rotation of the buckle 402 and buckle bracket 404.

Figure 3B:
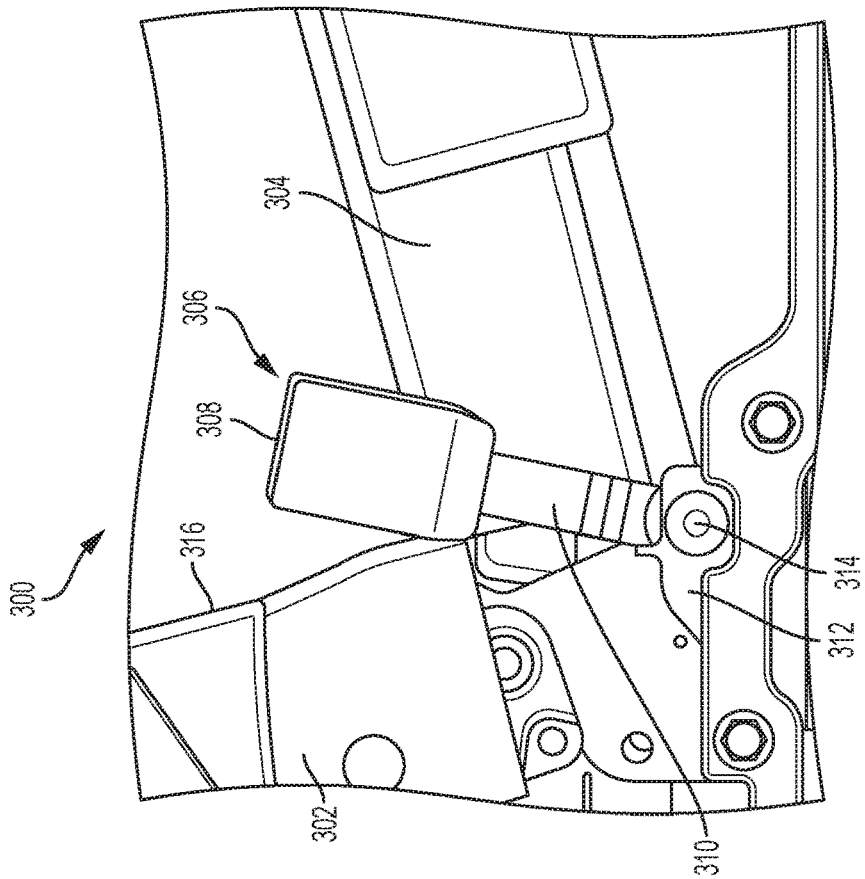

In contrast to the buckle assembly 306 illustrated in FIGS. 3A-3C, the exemplary buckle assembly 400 incorporates additional features which enable significant advantages over the buckle assembly 306. The curved slot 406 in the buckle bracket 404 permits the buckle 402 to move closer to the pivot 408 in response to a force applied downwardly on the buckle 402. In this manner, any object which may impact the buckle 402 such as, being dropped onto the buckle 402, may not result in damage to the buckle 402 because the motion of the buckle bracket 404 about the pivot 408 along the curved slot 406 permits the buckle 402 to move downward and absorb some of the force. In this manner, the curved slot 406 may reduce and/or prevent damage to the buckle 402 in some circumstances.

The torsion spring 412 of the exemplary seat buckle assembly 400 incorporates a first torsional coil 416 and a second torsional coil 418. A proximal end 420 of the torsion spring 412 may engage a fixed structure such as, for example, the anchor bracket 410 and a distal end 422 of the torsion spring 412 may engage the buckle bracket 404 such as, for example, at a spring hole 424. In this exemplary embodiment, the first torsional coil 416 operates to apply a torsion to the buckle bracket 404 which rotationally bias the bracket 404 about the pivot 408 toward the vertical or deployed position (as shown in FIG. 4A). The second torsional coil 418 operates to bias the buckle bracket 404 upwardly to encourage the pivot 408 to maintain a position toward one end of the curved slot 406. In this manner, any impact or other vertical force applied to the buckle 402 may be accommodated by an elastic deflection of the torsion spring 412 which permits the buckle bracket 404 to move downwardly in which the pivot 408 traverses along the curved slot 406 and/or the buckle bracket 404 may rotate about the pivot 408.

The exemplary seat belt bracket assembly 400 further incorporates an optional ramp surface 414. The ramp surface 414 may be positioned such that when the buckle bracket 404 rotates to a certain angle, an external camming surface 426 on the buckle bracket 404 may contact the ramp surface 414. Once contact is initiated, any further rotation of the buckle bracket 404 about the pivot 408 will cause the pivot 408 to initiate a translation along the curved slot 406. In this manner, the rotation of the buckle bracket 404 about the pivot 408 is controlled and coordinated with a translation of the pivot 408 along the curved slot 406. In addition, causing a translation of the pivot 408 through the curved slot 406 as it rotates further reduces the amount of horizontal space that is required to accommodate the buckle assembly 400 when in the stowed position as shown in FIG. 4C. For example, a seat design may need to include a pocket area (not shown) which provides a space for the buckle assembly in a stowed position. With the exemplary buckle assembly 400 of the present disclosure, the size of that pocket may be reduced.

In contrast, to the curved slot 406 in the buckle bracket 404 of the present disclosure, previous buckle brackets may have included a slot that was straight. These straight slot buckle brackets suffered from a problem where the amount of vertical length reduction may have been severely limited by the amount of space available to accommodate the motion of the buckle bracket directly downward. There had to be enough space between the pivot and any underlying structure (like an anchor bracket) to accommodate the translation of the buckle bracket downwardly on the pivot. In stark contrast, the curved slot 406 in the buckle bracket 404 in accordance with the present disclosure reduces the amount of space that is needed to permit translation of the pivot 408 along the slot 406. The curvature of the slot 406 permits the translation of the pivot through the slot to also result in a rotation of the buckle bracket 404 around the pivot. In this manner, the vertical distance between the pivot and any underlying structure may be minimized while simultaneously minimizing and/or preventing any impact on the buckle from damaging the buckle.

Figure 5:
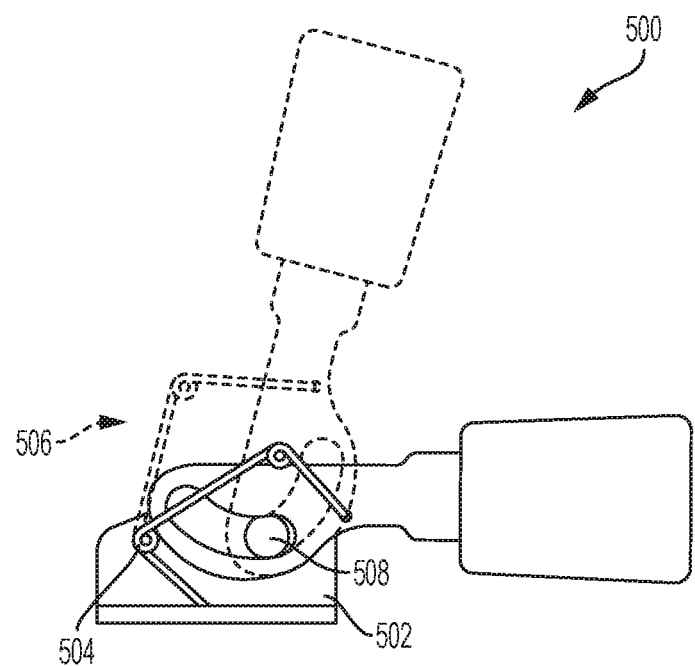
FIG. 5 is a schematic illustration of another exemplary seat belt buckle assembly in accordance with the present disclosure.

FIG. 5 is a schematic illustration of another exemplary seat belt buckle assembly 500 in accordance with the present disclosure. The differences between the buckle assembly 500 and the buckle assembly 400 of FIGS. 4A-4C include the absence of the optional ramp surface 414 in the anchor bracket 502 and the positioning of the first torsional coil 504 of the torsion spring 506 being fixed to the anchor bracket 502 at a location other than the pivot 508. FIG. 5 illustrates a stowed configuration in solid lines and a deployed configuration with hidden lines. In this manner, the rotation of the buckle bracket about the pivot and the translation of the pivot through the curved slot may be separate and independent from each other which may increase the flexibility of operation.

While the present disclosure has described a buckle assembly having a single solid buckle bracket, the buckle assembly may further include additional components such as, for example, a webbing material, a cable and cable attachments, and the like without limitation. Further, in addition to, or in lieu of a buckle bracket as illustrated in the present disclosure an exemplary embodiment in accordance with the present disclosure may include a sleeve that accommodates a webbing material that connects a buckle to the anchor bracket. In this embodiment the sleeve enclosing the webbing would incorporate the curved slot feature which enables translation of the pivot through the curved slot.

FIG. 6A is an elevation view of a partial cross-section of another exemplary embodiment of the present disclosure. In particular, FIG. 6A illustrates an exemplary embodiment in which a ramp surface 600, similar to the ramp surface 414 of FIGS. 4A-4C, is integrated into a pivot bushing 602. The pivot bushing 602 further includes a pivot 604 which are indicated by hidden lines. The pivot 604 extends into a curved slot 606 of a buckle bracket 608. The pivot bushing 602 is fixed to anchor bracket 610 which is, in turn, fixed to a vehicle structure (not shown). In this manner, the ramp surface 600 which is integrated into the pivot bushing 602 may operate as a camming surface which may coordinate rotation of the buckle bracket 608 with translation of the pivot 604 through the curved slot 606.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle seat belt buckle attachment system comprising:
an anchor bracket fixed to a vehicle;
a pivot fixed directly to the anchor bracket;
a buckle bracket defining a curved slot that continuously curves between ends of the slot and which receives the pivot; and
a buckle connected to the buckle bracket.

2. The system of claim 1, wherein the anchor bracket includes a ramp surface spaced away from and separate from the pivot, wherein the ramp surface is positioned to guide rotation of the buckle bracket around the pivot in response to the pivot translating within the curved slot beyond a predetermined distance, and wherein the buckle bracket further includes an external camming surface positioned between the curved slot and the ramp surface that contacts the ramp surface when the pivot of the anchor bracket translates within the curved slot beyond the predetermined distance.

3. The system of claim 1, wherein the pivot is integrated into a pivot bushing that includes a ramp surface spaced away from and separate from the pivot, wherein the ramp surface is positioned to guide rotation of the buckle bracket around the pivot in response to the pivot translating within the curved slot beyond a predetermined distance, and wherein the buckle bracket further includes an external camming surface positioned between the curved slot and the ramp surface that contacts the ramp surface when the pivot of the anchor bracket translates within the curved slot beyond the predetermined distance.

4. The system of claim 1, further comprising a torsion spring in contact with the anchor bracket and the buckle bracket.

5. The system of claim 4, wherein the torsion spring biases rotation of the buckle bracket about the pivot in a first rotational direction.

6. The system of claim 5, wherein the torsion spring comprises a first torsion coil positioned around the pivot.

7. The system of claim 4, wherein the torsion spring biases the pivot toward one end of the curved slot.

8. The system of claim 7, wherein the torsion spring comprises a second torsion coil that biases the pivot toward one end of the curved slot.

9. A vehicle comprising:
a passenger seat including a seat bottom connected to a vehicle structure and a seat back pivotally connected to the vehicle structure;
an anchor bracket fixed to the vehicle structure;
a pivot fixed directly to the anchor bracket;
a buckle bracket defining a curved slot that continuously curves between ends of the slot and which receives the pivot; and
a buckle connected to the buckle bracket.

10. The vehicle of claim 9, wherein the seat back is pivotally rotatable between a deployed position and a stowed position.

11. The vehicle of claim 10, wherein a surface of the seat back contacts the buckle when moving from the deployed position to the stowed position.

12. The vehicle of claim 11, wherein the buckle and the buckle bracket rotate about the pivot in response to contact between the seat back surface and the buckle when pivoting of the seat back further toward the stowed position.

13. The vehicle of claim 9, wherein the anchor bracket includes a ramp surface spaced away from and separate from the pivot, wherein the ramp surface is positioned to guide rotation of the buckle bracket around the pivot in response to the pivot translating within the curved slot beyond a predetermined distance, and wherein the buckle bracket further includes an external camming surface positioned between the curved slot and the ramp surface that contacts the ramp surface when the pivot of the anchor bracket translates within the curved slot beyond the predetermined distance.

14. The vehicle of claim 9, wherein the pivot is integrated into a pivot bushing that includes a ramp surface spaced away from and separate from the pivot, wherein the ramp surface is positioned to guide rotation of the buckle bracket around the pivot in response to the pivot translating within the curved slot beyond a predetermined distance, and wherein the buckle bracket further includes an external camming surface positioned between the curved slot and the ramp surface that contacts the ramp surface when the pivot of the anchor bracket translates within the curved slot beyond the predetermined distance.

15. The vehicle of claim 9, further comprising a torsion spring in contact with the anchor bracket and the buckle bracket.

16. The vehicle of claim 15, wherein the torsion spring biases rotation of the buckle bracket about the pivot in a first rotational direction.

17. The vehicle of claim 16, wherein the torsion spring comprises a first torsion coil positioned around the pivot.

18. The vehicle of claim 15, wherein the torsion spring biases the pivot toward one end of the curved slot.

19. The vehicle of claim 18, wherein the torsion spring comprises a second torsion coil that biases the pivot toward one end of the curved slot.

* * * * *